(12) United States Patent
Weber et al.

(10) Patent No.: US 9,159,979 B2
(45) Date of Patent: *Oct. 13, 2015

(54) NONWOVEN FABRIC HAVING CROSS-LINKING MATERIAL

(75) Inventors: Christoph Weber, Laudenbach (DE); Michael Roth, Mainz (DE); Iain Smith, Shrivenham Swindon (GB); Giovanni Gentilcore, Stogursey (GB)

(73) Assignee: CARL FREUDENBERG KG, Weinheim (DE)

( * ) Notice: Subject to any disclaimer, the term of this patent is extended or adjusted under 35 U.S.C. 154(b) by 1005 days.

This patent is subject to a terminal disclaimer.

(21) Appl. No.: 12/918,362

(22) PCT Filed: Feb. 19, 2009

(86) PCT No.: PCT/EP2009/001197
§ 371 (c)(1),
(2), (4) Date: Dec. 8, 2010

(87) PCT Pub. No.: WO2009/103537
PCT Pub. Date: Aug. 27, 2009

(65) Prior Publication Data
US 2011/0081601 A1    Apr. 7, 2011

(30) Foreign Application Priority Data
Feb. 20, 2008 (DE) .................. 10 2008 010 152

(51) Int. Cl.
*H01M 2/16* (2006.01)
*H01M 8/02* (2006.01)

(52) U.S. Cl.
CPC ............ *H01M 2/1606* (2013.01); *H01M 2/162* (2013.01); *H01M 2/166* (2013.01); *H01M 2/1646* (2013.01); *H01M 2/1653* (2013.01); *H01M 2/1626* (2013.01); *H01M 8/0226* (2013.01); *H01M 8/0241* (2013.01); *H01M 8/0289* (2013.01); *Y10T 29/49108* (2015.01)

(58) Field of Classification Search
CPC ............ H01M 2/1606; H01M 2/1626; H01M 2/1646; H01M 2/1653; H01M 2/162; H01M 2/166; H01M 2008/1095; Y10S 428/25; Y10S 425/119
USPC ........................... 428/317.9; 442/76, 375, 417
See application file for complete search history.

(56) References Cited

U.S. PATENT DOCUMENTS

| | | | |
|---|---|---|---|
| 3,022,366 A | 2/1962 | Kilroy | |
| 4,180,611 A | 12/1979 | Schmidt et al. | |
| 4,983,450 A | 1/1991 | Yanagihara et al. | |
| 5,328,758 A | 7/1994 | Markell et al. | |
| 5,747,110 A | 5/1998 | Tallentire et al. | |
| 5,800,947 A * | 9/1998 | Kohler et al. | ................. 429/223 |
| 5,882,721 A | 3/1999 | Delnick | |
| 6,632,561 B1 | 10/2003 | Bauer et al. | |
| 6,746,803 B1 | 6/2004 | Bauer et al. | |
| 7,662,517 B2 | 2/2010 | Lee et al. | |
| 2002/0168569 A1 | 11/2002 | Barriere et al. | |
| 2002/0180088 A1 | 12/2002 | Hashiguchi et al. | |
| 2003/0064282 A1 | 4/2003 | Nakagawa et al. | |
| 2004/0202835 A1 | 10/2004 | Gronroos | |
| 2005/0032451 A1 | 2/2005 | Kritzer et al. | |
| 2005/0158630 A1 | 7/2005 | Lambert | |
| 2005/0208383 A1 * | 9/2005 | Totsuka et al. | ................. 429/247 |
| 2005/0221165 A1 | 10/2005 | Hennige et al. | |
| 2005/0221192 A1 | 10/2005 | Hennige et al. | |
| 2006/0008700 A1 | 1/2006 | Yong et al. | |
| 2006/0024569 A1 | 2/2006 | Hennige et al. | |
| 2006/0078722 A1 | 4/2006 | Noumi et al. | |
| 2006/0151742 A1 | 7/2006 | Hegi | |
| 2007/0122716 A1 | 5/2007 | Seo et al. | |
| 2007/0139860 A1 | 6/2007 | Hoerpel et al. | |
| 2007/0207693 A1 | 9/2007 | Tsukuda et al. | |
| 2007/0264577 A1 | 11/2007 | Katayama et al. | |
| 2008/0070107 A1 | 3/2008 | Kasamatsu et al. | |
| 2008/0138700 A1 | 6/2008 | Horpel et al. | |
| 2008/0245735 A1 | 10/2008 | Hennige et al. | |
| 2009/0311418 A1 | 12/2009 | Hennige et al. | |
| 2009/0311589 A1 | 12/2009 | Kim et al. | |
| 2010/0196688 A1 | 8/2010 | Kritzer et al. | |
| 2010/0206804 A1 | 8/2010 | Weber et al. | |

FOREIGN PATENT DOCUMENTS

| | | |
|---|---|---|
| CH | 451492 A | 5/1968 |
| CN | 1331843 A | 1/2002 |
| CN | 1670989 A | 9/2005 |
| CN | 1679183 A | 10/2005 |
| DE | 3125751 A1 | 3/1982 |
| DE | 3605981 A1 | 8/1987 |
| DE | 19850826 A1 | 5/2000 |
| DE | 10238944 A1 | 3/2004 |
| DE | 10238945 A1 | 3/2004 |
| DE | 10336380 A1 | 3/2005 |

(Continued)

OTHER PUBLICATIONS

International Search Report for PCT/EP2009/001197 mailed on Apr. 8, 2009.
Japanese Office Action in JP 2010-547109; dated Mar. 24, 2012.
George Odian, Principles of Polymerization, A Wiley-Interscience Publication, Dec. 1991, pp. 7, Third Edition, John Wiley & Sons, Inc., Staten Island, New York.
Roethemeyer et al., Kautschuktechnologie, Sep. 2001, pp. 3.
Thermoplastics & Thermosetting Polymers http://www.transtutors.com/chemistry-homework-help/polymers/thermoplastics-and-thermosetting-polymers-difference.aspx (Mar. 21, 2013).

*Primary Examiner* — Jeremy R Pierce
(74) *Attorney, Agent, or Firm* — Leydig, Voit & Mayer, Ltd.

(57) ABSTRACT

A layer includes a main body having a plurality of first pores and at least one crosslinked binder.

26 Claims, No Drawings

(56) References Cited

FOREIGN PATENT DOCUMENTS

| | | |
|---|---|---|
| DE | 10347568 A1 | 5/2005 |
| EP | 0892448 A2 | 1/1999 |
| EP | 1138092 B1 | 9/2002 |
| EP | 1271673 A1 | 1/2003 |
| EP | 1724395 A1 | 11/2006 |
| EP | 1490550 B1 | 1/2008 |
| EP | 1965454 A1 | 9/2008 |
| GB | 1148852 A | 4/1969 |
| GB | 2078769 A | 1/1982 |
| JP | 57044969 A | 3/1982 |
| JP | 63503074 A | 11/1988 |
| JP | 08185847 A | 7/1996 |
| JP | 2002529891 A | 5/2000 |
| JP | 2005268096 A | 9/2005 |
| JP | 2008210791 A | 9/2008 |
| RU | 2074457 C1 | 2/1997 |
| WO | WO 8706395 A1 | 10/1987 |
| WO | WO 9835738 A1 | 8/1998 |
| WO | WO 0024075 A1 | 4/2000 |
| WO | WO 0062355 A1 | 10/2000 |
| WO | WO 2004021475 A1 | 3/2004 |
| WO | WO 2005038959 A1 | 4/2005 |
| WO | WO 2005104269 A1 | 11/2005 |
| WO | WO 2006062153 A1 | 6/2006 |
| WO | WO 2006068428 A1 | 6/2006 |
| WO | WO 2007028662 A1 | 3/2007 |
| WO | WO 2007126242 A1 | 11/2007 |

* cited by examiner

NONWOVEN FABRIC HAVING CROSS-LINKING MATERIAL

CROSS REFERENCE TO PRIOR APPLICATIONS

This application is a U.S. National Phase application under 35 U.S.C. §371 of International Application No. PCT/EP2009/001197, filed on Feb. 19, 2009 and claiming priority to German Application No. DE 10 2008 010 152.4, filed Feb. 20, 2008. The International Application was published in German on Aug. 27, 2009 as WO 2009/103537 under PCT Article 21 (2).

The invention relates to a layer having a main body, wherein the main body has pores, wherein the layer has a binder, wherein the binder is crosslinked. The invention also relates to methods for producing the layer, the use thereof and devices containing the layer.

BACKGROUND

Layers of the aforementioned type are already known from the prior art. Layers of this type are used as separators in batteries and capacitors, which have the function of energy storage. The storage of a charge in batteries and capacitors takes place chemically, physically or in a mixed form, for example by chemisorption.

To avoid an internal discharge within the battery or capacitor, electrodes of opposing charge are separated from one another mechanically by materials which do not conduct electrons known as separators or spacers. At the same time, the separators or spacers allow the transport of ionic charge carriers of an electrolyte between the electrodes owing to their porosity which is adapted to the energy storage system and the application thereof.

The separators known from the prior art have small, mutually crosslinked openings of about a micrometer. These openings should be as large as possible so that the electrolyte conductivity in the impregnated separator is as high as possible and the battery therefore has a high power density. If the openings are too large however, metal dendrites can lead to a short circuit between the two electrodes which are actually to be electrically separated from one another. The metal dendrites consist either of lithium or of other metals which can be in the form of impurities in the battery.

In addition, particles of electrically conductive electrode materials can migrate through the openings. Owing to these processes, a short circuit can occur between the electrodes and the spontaneous discharge of the battery or the capacitor can be markedly accelerated.

Locally very high currents can flow during a short circuit, leading to the liberation of heat. This heat can cause the separator to melt with the result that the insulating effect of the separator can in turn decrease significantly. A battery which runs down very rapidly represents a high safety risk owing to its high energy content and the combustibility of the electrolyte and other constituents.

A further drawback of the separators known from the prior art is their inability to withstand rising temperatures. The melting point is about 130° C. when polyethylene is used and 150° C. when polypropylene is used.

Possible causes of short circuits include shrinkage of the separator due to an excessively high temperature in the battery, growth of metal dendrites due to a reduction of metal ions (lithium, iron, manganese or other metal impurities), abrasion of electrode particles, cutting abrasion or broken electrode coating and direct contact of the two flat electrodes under pressure.

EP 0 892 448 A2 discloses what is known as the shut-down mechanism, which counteracts the planar propagation of local heating, for example due to a short circuit, in that the ion conduction is prevented in the vicinity of the initial short circuit. Owing to the heat evolved by the short circuit, polyethylene is heated to such an extent that it melts and closes the pores of the separator. High melting point polypropylene remains mechanically intact.

US 2002/0168569 A1 describes the construction of a separator consisting of polyvinyl fluoride, which is partially dissolved by a solvent in the production process, is blended with silicon dioxide particles and is applied as a thin film. A porous membrane remains when the solvent is removed.

WO 2006/068428 A1 describes the production of separators for lithium ion batteries using a polyolefin separator which is additionally filled with gel-like polymers and inorganic particles.

WO 2004/021475 A1 describes the use of ceramic particles which are shaped into a thin planar product from oxides of the elements silicon, aluminium and/or zirconium, via organosilicon adhesives and inorganic binders.

In order to establish sufficient mechanical flexibility, the ceramic particles are introduced into a supporting material, for example a non-woven fabric. This is disclosed in WO 2005/038959 A1.

The use of low-melting-point waxes as an admixture to a ceramic paste in order to prevent short circuits in the early stage of metal dendrite formation is described in WO 2005/104269 A1.

WO 2007/028662 A1 describes the addition of polymer particles with a melting point of over 100° C. to ceramic fillers in order to improve the mechanical properties of the separator. The described materials are to function as a separator for lithium ion materials. Although these separators lead to higher resistance to heat than membranes, they cannot be used commercially. This is due, on the one hand, to the relatively high costs and, on the other hand, to the excessive thickness of the material, which is greater than 25 μm.

WO 2000/024075 A1 describes the production of a membrane which can be used in fuel cells. It consists of glass fibre materials in which fluorocarbon polymers are fixed by means of a silicate binder.

Finally, JP 2005268096 A describes a separator for Li-ion batteries which is produced by melting together thermoplastic particles in a polyethylene/polypropylene fibrous supporting material by heating. This separator has a bubble-like pore structure with a pore diameter of 0.1-15 μm.

European patent EP 1 138 092 B1 relates to composite bodies for electrochemical cells. These composite bodies consist of two layers, a layer of particles and binder being applied to a second layer. The second layer can be a film or non-woven fabric.

US 2006/0078722 A1 discloses porous films of a crosslinked polyolefin resin.

EP 1 271 673 A1 relates to gas-permeable separators for batteries. In this case, a crosslinked polymer layer is applied to a porous substrate.

However, the prior art does not reveal a cost-efficient separator which has high porosity and high heat resistance while having a low thickness and which can be used over a broad temperature range with high safety requirements in batteries with a high power and energy density. A particular problem of known materials is that they shrink at elevated temperature, thereby reducing porosity and adversely affecting the properties. In addition, there are no methods for producing efficient separators simply in a few operating steps.

SUMMARY OF THE INVENTION

In an aspect of the invention a layer is provided which overcomes the described problems.

In particular, an aspect of the invention is to configure and develop a layer in such a way that, after cost-effective production and with a low thickness it has a high porosity, good ion conductivity and high heat resistance. In particular, the material should have a high power density. When used in batteries, a high power density brings about lower inherent heating and higher efficiency. In particular, the material should maintain its structure and not shrink or change in any undesirable way at elevated temperature. A method for producing such layers in a simple, uniform and rapid manner is also to be provided.

DETAILED DESCRIPTION

The invention relates to a layer with a main body, the main body having pores, wherein the layer has a binder, wherein the binder is crosslinked.

In this embodiment, the main body can be filled at least in part with particles, the particles at least in part filling out the first pores and forming particle-filled regions, the particles in the filled regions forming second pores.

The binder is contained in the pores. If particles are additionally present, the binder is contained in the second pores. According to the invention, the binder is a polymer, in particular an organic polymer. The polymer is crosslinked. The binder therefore forms a network in the first pores and the second pores. This stabilises the layer in its entirety. The embedding of the particles in the main body can optionally be stabilised. A layer according to the invention is obtained, in particular, in that crosslinking takes place in the presence of the main body. If particles are present, the binder can bind the particles to the non-woven fabric. In addition, it binds together the fibres of the non-woven fabric. The binders are crosslinked according to the invention (transversely crosslinked). This means that the polymer chains of the binder are at least in part covalently linked to one another. The binder molecules thus form a three-dimensional network. The network is microporous and allows the transfer and diffusion of liquids as well as the ionic and non-ionic compounds contained in the liquids. The polymer network preferably also stabilises the embedded particles.

The particles can form second pores in the filled regions, the average diameter of the particles being greater than the average pore size of the majority of the second pores.

The frequency distribution of the average pore sizes is preferably adjusted according to the invention in such a way that more than 50% of the second pores have average pore sizes lying below the average of the particles. The pore structure of a cost-efficient main body, for example a non-woven fabric, can be modified by the crosslinking and the appropriate arrangement and choice of binders and optionally particles.

The porosity of the layer according to the invention can be increased in comparison to polyolefin membranes without reducing the stability thereof. The arrangement of a plurality of particles, of which the average diameter is greater than the average pore size of the majority of the second pores in the filled region, allows the formation of a high porosity and therefore a favoured uptake of electrolyte by the main body. At the same time, a pore structure is created in which almost no harmful metal dendrites are able to form. Owing to the crosslinking and the arrangement of the particles, it is thus possible to produce a pore structure which is not in the form of bubbles but is labyrinthine and comprises extended pores. Dendritic interpenetration right through from one side of the layer to the other is almost ruled out with a pore structure of this type. Short circuits in batteries or capacitors are effectively prevented in this way. The layer according to the invention is therefore particularly suitable as a separator for batteries and capacitors with a high power and energy density. The layer according to the invention can be used over a wide temperature range with high safety requirements.

The particles could be spherical. As a result, a predominantly close packing of spheres can advantageously be formed in the first pores of the main body, in particular the non-woven fabric. The average pore size of the majority of the second pores is then basically determined by the geometric conditions in sphere packings. There is an infinite number of ways of producing a close packing of spheres. A common feature is that they consist of hexagonal layers of spheres. The two most important representatives are the hexagonal close packing of spheres (layer sequence A, B, A, B, A, B) and the cubic close packing of spheres (layer sequence A, B, C, A, B, C, A). The cubic close packing of spheres is also known as face-centred cubic sphere packing. In a close packing of spheres, each sphere has twelve close neighbours, six in the actual layer and three above and three below. They form a cubic octahedron in the case of cubic packing and an anticubic octahedron in the case of hexagonal packing. The density ratio of a close packing of spheres is 74%. However, it is desirable to produce a porosity which is as high as possible. Therefore, not all particles will form a close packing of spheres in the first pores of the main body. Instead, zones with a loose pile of particles will occur and promote high porosity.

In a further embodiment of the invention, the particles are not spherical, or some non-spherical particles are present. This embodiment relates, in particular, to the use of inorganic particles which frequently have an irregular fissured form with corners and edges. Such particles can also be mixed with spherical particles, for example in a proportion of up to 10, 20 or 50% by weight. The properties of the particles can advantageously be combined in this way.

The particles could be homogeneously distributed in a planar manner in the main body. Short circuits can be particularly effectively prevented with this specific configuration. Metal dendrites and abrasion are almost incapable of migrating through a homogeneously occupied area. In addition, the direct contact of electrodes when pressure is applied is avoided owing to such an area. Against this background, it is specifically conceivable that all first pores of the main body are homogeneously filled with the particles in such a way that the layer has predominantly average pore sizes which are smaller than the average diameters of the particles.

The main body could have a coating of the particles. A coating also advantageously prevents short circuits, as mentioned above. If a layer is provided with a coating, a boundary region inevitably appears on the main body, the boundary region being filled at least in part with particles. However, the layer according to the invention differs significantly from known separators, for example from EP 1138092, in that it is not a composite material consisting of a non-woven fabric and a further layer produced from particles and binders. According to the invention, the crosslinking takes place entirely or at least in part within the main body and optionally in the presence of particles. If particles are used, they are embedded in the main body and are surrounded by crosslinked polymer. The particles are preferably substantially homogenously distributed in the main body. However, it is also possible according to the invention that the particles are irregularly distributed. For example, the majority of particles can be arranged towards one surface of the main body. Preferably, at least 2, 5, 10 or 20% by volume of the first pores are filled with particles within the main body.

The layer according to the invention contains a binder. The binder preferably consists of organic polymers. The use of a binder of organic polymers allows a layer with sufficient mechanical flexibility to be produced.

The binder is crosslinked by linking crosslinkable groups of the binder molecules. Suitable crosslinkable binders include polymers or copolymers which are produced by polymerisation in such a way that the polymer contains crosslinkable groups in the molecular chain.

The polymer can also be chemically equipped with crosslinkable groups after polymerisation. According to the invention, binder mixtures containing at least one crosslinkable binder can also be used.

According to the invention, the binder is preferably the reaction product of a polymerisation process which is carried out in the presence of the main body and optionally the particles. The binder is selected, for example, from the group of polymers of beta-unsaturated carboxylic acids, the salts thereof, the esters, amides and nitriles thereof, and copolymers of these compounds. Acrylates, methacrylates and derivatives thereof as well as the corresponding amides are particularly preferred.

In preferred embodiments of the invention, the binder is a polymer selected from polyester, polyamide, polyether, polycarboxylates, a polycarboxylic acid, a polyvinyl compound, a polyolefin, a rubber, polyvinylpyrrolidone, a halogenated polymer and/or an unsaturated polymer or a copolymer thereof. The binder must be crosslinkable. Therefore, if the binder is, for example, a non-crosslinkable polyolefin, it must be chemically modified so that crosslinking points are contained.

The binders can be used in the form of homopolymers or as copolymers. Suitable copolymers include, for example, random copolymers, gradient copolymers, alternating copolymers, block copolymers or graft polymers. The copolymers can consist of two, three, four or more different monomers (terpolymers, tetrapolymers).

In a preferred embodiment of the invention, the binder is a polyester or a polyamide or a copolymer thereof. The copolymers can consist of various polyamide and/or polyester monomers or copolymers of such monomers with other monomers. Binders of this type are distinguished by very good properties of adhesion.

The binder stabilises the layer. This is brought about by the three-dimensional network which the binder forms in the pores. The optionally-contained particles are thus consolidated at their positions in the layer. According to the invention it is also possible that the crosslinking also takes place between the binder and the main body or between the binder and the particles. This is possible, for example, if surface-treated reactive particles and/or main bodies are used. The binder can also have a non-covalent physical affinity for the particles and/or the main body.

The melting point of the binder and/or the particles could lie below the melting points of the main body fibres. If such a binder/particle is selected, the layer can in part produce what is known as a shut-down mechanism. With a shut-down mechanism, the fusing particles and/or the binder close the pores of the main body so that no dendritic interpenetration through the pores and therefore short circuits can occur.

Against this background it is conceivable that particles with different melting points are used. A stepwise or progressive closure of the pores can thus be brought about as the temperature increases.

Owing to the crosslinking of the monomer mixture, however, the microporous main body preferably does not fuse completely. It forms a heat-stable matrix so to speak and therefore exhibits high heat resistance overall. The meltdown of such a separator in a battery takes place only at high temperatures, so the separator does not collapse. However, the filler particles allow particulate fusion. This leads to an intentional regioselective shut-down mechanism and therefore to an increase in battery safety. A combination of advantageous properties, namely high meltdown temperature and an adaptable shut-down temperature, is thus obtained. This is advantageous, for example, for applications in the automotive industry.

The crosslinking enables the layer to be used as a heat-stable separator. It has been observed according to the invention that the crosslinking improves the heat resistance. Uncrosslinked materials, on the other hand, can relax and shrink when subjected to a steady load at elevated temperature. The layer according to the invention preferably does not exhibit significant shrinkage at a temperature of 200° C. Therefore, the shrinkage is less than 10%, preferably 5% and more preferably 1%, preferably after 30 min or more preferably after 60 min at 200° C. (Measurement method: place flat item in an oven (generally in air) at a given temperature for a given period of time and then measure shrinkage of the area.)

The particles could have an average diameter in the range of 0.01 to 50 μm, in particular 0.01 to 10 μm, particularly preferably 0.05 to 5 μm. The selection of the average diameter from this range has proven particularly advantageous for avoiding short circuits due to the formation of dendritic interpenetration or abrasion.

The particles could consist of organic polymers. Suitable polymers include, for example, polyacetals, polycycloolefin copolymers, polyesters, polyimides, polyether ketones, polycarboxylic acids, polycarboxylates, rubbers, polyvinyl compounds, polyethers, polynitriles, polysulfones, polyterephthalates, polynaphthalates and halogenated polymers, in particular fluorinated and chlorinated polymers.

The organic polymers may be homopolymers or copolymers. Suitable copolymers include, for example, random copolymers, gradient copolymers, alternating copolymers, block copolymers or graft polymers. The copolymers can consist of two, three or more different monomers (terpolymers, tetrapolymers). The aforementioned materials may also be processed into particles in the form of mixtures. Thermoplastic polymers and polymer mixtures can generally be used, or crosslinked polymers and polymer mixtures such elastomers or thermosetting resins.

The particles may contain or consist of, in particular, polypropylene, polyvinylpyrrolidone, polyvinylidenefluoride, polyester, polytetrafluoroethylene (PTFE), perfluoroethylene-propylene (FEP), polystyrene, styrene butadiene copolymers, polyacrylates, polymethacrylates, polyvinylpyridine, polyetherketones, polybutylterephthalate, polyethylene terephthalate, polyacrylonitrile, polyethylenenaphthalate, polysulfone, polyethylene, polyoxymethylene, polybenzimidazole or nitrile butadiene polymers, or copolymers of the aforementioned polymers. Homopolymers, copolymers or block copolymers of vinylidenefluoride (VDF), polytetrafluoroethylene (PTFE) and polyoxymethylene (POM, also called polyacetal or polyformaldehyde) are particularly preferred.

In a preferred embodiment of the invention, the particles consist of polyacetals such as polyoxymethylene (POM) or the particles contain polyacetals. Copolymers of acetals can also be used, for example with trioxane as the comonomer. Polyacetals are distinguished by excellent dimensional stability and heat resistance. In addition, they also have only a low water uptake. This is advantageous according to the invention as the filled main body then only absorbs a little water overall.

In a further embodiment of the invention, the particles consist of or contain cycloolefin copolymers (COC). The thermal properties of COC may be intentionally varied and therefore adapted to the desired application areas by varying the ratios of incorporation of cyclic and linear olefins within a broad range. The heat resistance can thus be adjusted substantially in a range of 65 to 175° C. The COCs are distinguished by an extremely low water uptake and very good electrical insulating properties.

In a further embodiment of the invention, the particles consist of or contain polyesters. In particular, liquid-crystalline polyesters (LCP) are preferred. They are available for example from Ticona under the trade name "Vectra LCP". Liquid-crystalline polyesters are distinguished by high dimensional stability, high heat resistance and good resistance to chemicals.

In a further embodiment of the invention, the particles consist of polyimides (PI) or copolymers thereof, or contain them. Suitable copolymers include, for example, polyetherimides (PEI) and polyamideimides (PAI). The use of polyimides is advantageous because they have high mechanical strength and high heat resistance. They also have good surface properties which can be purposefully adjusted from hydrophilic to hydrophobic.

In a further embodiment of the invention, the particles consist of or contain polyether ketones (PEK) or copolymers thereof. Polyetherether ketones (PEEK) are particularly suitable. Polyether ketones are resistant to high temperatures and very resistant to chemicals.

In a further embodiment of the invention, the particles consist of or contain polycarboxylic acids or polycarboylates or copolymers thereof. In particular, homopolymers or copolymers, in particular block copolymers, are suitable. The polymers are produced, in particular, from methacrylic acid, methacrylates, methacrylamides and methylacrylic acid esters such as, for example, methyl-, ethyl-, propyl-, butyl-, hexyl-, 2-ethylhexyl-, stearyl-, lauryl-, cyclohexyl-, benzyl-, trifluoromethyl-, hexafluoropropyl-, tetrafluoropropyl-methacrylates, methacrylamides and methacrylic acid. The corresponding acrylates, acrylamides and acrylic acid compounds can also be used. Use of these homopolymers and copolymers allows the desired thermal characteristics such as shut-down of the separator, adhesion to the main body and to the binder, and the wetting properties of the particles to be purposefully adjusted.

In a further embodiment of the invention, the particles consist of rubber or contain a rubber. The rubbers are preferably crosslinked. Generally known rubbers such as ethylene propylene diene rubber (EPDM rubber) can be used. In particular, EPDM rubber has high elasticity and good resistance to chemicals, in particular to polar organic media, and can be used over a wide temperature range. Other suitable rubbers include, for example, natural rubber, isoprene rubber, butadiene rubber, chloroprene rubber, styrene butadiene rubber and nitrile butadiene rubber. The polymers of these rubbers contain crosslinkable, unsaturated double bonds and are known as R-rubbers. These rubbers are preferably crosslinked. They can be used, for example, as homopolymers or copolymers, in particular block copolymers.

Fluorinated rubbers such as perfluoro rubber (FFKM), fluoro rubber (FKM) or propylene tetrafluoroethylene rubber (FPM) and copolymers thereof can also be used. FFKM is particularly preferred. These binders, in particular FFKM, are distinguished in that they can be used in a high temperature range and have very good resistance to media and chemicals and minimal swelling. They are therefore suitable, in particular, for applications at high temperatures in an aggressive environment, such as in fuel cells.

In a further embodiment of the invention, the particles consist of or contain a fluorinated or halogenated polymer. This can be produced, for example, from vinylidenefluoride (VDF), polytetrafluoroethylene (PTFE), hexafluoropropylene (HFP) or chlorotrifluoroethylene (CTFE). For example, homopolymers or copolymers, in particular block copolymers, can be used in this embodiment. The copolymers can consist of different halogenated monomers or may be copolymers of halogenated monomers with other monomers. The polymers and monomers can be completely fluorinated or chlorinated or partially fluorinated or chlorinated. In a particular embodiment of the invention, the comonomer content of the halogenenated monomers, in particular of HFP or CTFE, of the total polymer, is between 1 and 25% by weight. The halogenated polymers are distinguished by high resistance to heat and to chemicals and by good wettability. They are particularly suitable for use with fluorinated or partially fluorinated binders. The heat resistance and the processing temperature can be varied over a broad temperature range by the use and selection of copolymers. The processing temperature of the binder can thus be adapted to the melting temperature of the particles. It is also possible to adjust a shut-down temperature.

The use of a copolymer of PTFE and perfluoro-3,6-dioxa-4-methyl-7-octene-sulfonic acid (PFSA) is particularly preferred. This is available from Du Pont under the trade name Nafion. It is advantageous according to the invention because it is a good conductor of cations and protons.

The use of organic polymers for the particles allows fusion of the particles for achieving a shut-down effect. In view of the crosslinking, it is possible to produce a layer which can easily be cut to size without it crumbling. The layer usually crumbles if a relatively high proportion of inorganic particles is present in the layer. Against this background, it is conceivable to use mixtures of different particles or core-shell particles. Stepwise or progressive closure of the pores with increasing temperature can be brought about in this way.

The binders and particles that can be used according to the invention, in particular the organic particles, are preferably heat-resistant to a great extent. Preferably, the binders and/or particles are stable at temperatures of 100, 120, 150, 175 or 200° C., in particular for 24 hours. This enables them to be used in fuel cells.

It is also conceivable to use or add inorganic particles or hybrid inorganic/organic particles. These particles do not melt below a temperature of below 400° C. In addition, these particles can be selected with basic properties in order at least in part to reduce the proton activity occurring in batteries and thus actively to counteract the aging of the other battery components or the evolution of gas.

Suitable inorganic particles include, for example, metal oxides, metal hydroxides, nitrides, carbonitrides, carbooxonitrides, borates, silicates, sulphates, carbonates and glass particles. The particles can consist of or contain aluminium oxides, silicon oxides, zeolites, titanates and/or perovskites.

Mixtures of these particles or mixtures with other materials can also be used. Suitable glass particles include, in particular, nano and microglass particles. These particles can consist of or contain alkali and alkaline earth sulphates, alkali and alkaline earth carbonates and lithium borates. The inorganic particles can be untreated but also chemically modified in order to permit ideal wetting with the electrolyte present so as to reduce proton activity owing to basic properties, to fix impurities owing to complexing functions and to selectively increase the Liion transport number in the electrolyte owing to complexing functions. The organic particles, the binder and the non-woven fabric can also deploy these modes of operation.

In an embodiment of the invention, inorganic particles are used in a mixture with organic particles. The inorganic particles can have an intrinsic fissured or porous structure and thus increase the porosity, in particular of particle mixtures. They also have high heat resistance, high resistance to chemicals and good wettability. Thus, for example, mixtures of organic and inorganic particles can be used in which up to 2, 5, 10, 25 or 99% by weight of the particles are inorganic particles.

It is also possible to use inorganic particles which are spherical or of which the external shape has a uniform arrangement of faces resembling a sphere. Such particles are obtainable, for example, by crystallisation.

The particles which can be used according to the invention can be produced by known methods. Methods are accordingly known in which suitable, in particular spherical, organic particles are already obtained as the reaction product of polymerisation. Preferred methods include emulsion or dispersion polymerisation.

In a further embodiment, the particles are obtained by the further processing of polymers. For example, polymer granules can be ground. Separation processes such as sieving are optionally then employed in order to obtain the desired size distribution. The particles can consist of mixtures of different particle sizes. The porosity and the pore size distribution can thus be varied.

The particles can be inert, capable of swelling or soluble in the monomer solution. The particles can also be chemically treated, for example by modification of the surfaces. The surfaces can accordingly be made hydrophilic. The surfaces can also be treated in such a way that they have reactive groups for crosslinking with the binder.

The main body can be a non-woven fabric, woven fabric, knitted fabric, membrane, film, felt, paper or foam. It is particularly preferable to use a non-woven fabric. A non-woven fabric (or fleece) is a textile sheet of individual fibres. The non-woven fabric is preferably consolidated.

In a preferred embodiment of the invention, the main body, in particular the non-woven fabric, consists of fibres, the pores being formed from the fibres.

The fibres of the main body, in particular the non-woven fabric, could be produced from or contain organic polymers, in particular polybutylene terephthalate, polyethylene terephthalate, polyacrylonitrile, polyvinylidene fluoride, polyetherether ketones, polyethylene naphthalate, polysulfones, polyimide, polyester, polypropylene, polyoxymethylene, polyamide, polyvinylpyrrolidone or cellulose, such as viscose. It is also conceivable to use bicomponent fibres. These can have or contain the aforementioned polymers. Mixed fibres of cellulose and polysilicic acid, for example, offered under the trade name Visil are suitable. The use of these organic polymers allows production of a layer exhibiting only slight heat shrinkage. In addition, these materials are substantially electrochemically resistant to the electrolytes and gases used in batteries and capacitors.

The layer according to the invention can have the following composition, based on the dry weight:
- 20 to 98% by weight, in particular 50 to 95% by weight main body,
- 0 to 80% by weight, in particular 2 to 50% by weight particles,
- 0.1 to 30% by weight, in particular 0.5 to 15% by weight binder.

In preferred embodiments, the layer according to the invention has a weight per unit area which is 110 to 500%, in particular 120 to 300% or 140 to 200% of the weight per unit area of the main body.

The average length of the fibres of the non-woven fabric could be at least twice, preferably a multiple of the average diameter thereof. A particularly tear-resistant non-woven fabric can be produced with this specific configuration because the fibres can be interlaced with one another.

At least 90% of the fibres of the main body, in particular of the non-woven fabric, could have an average diameter of at most 12 µm. This specific configuration allows the construction of a layer having relatively small pore sizes of the first pores. An even finer porosity can be achieved in that at least 40% of the fibres have an average diameter of at most 8 µm.

The layer could be characterised by a thickness of at most 100 µm. A layer of this thickness can still be wound without difficulty and allows very safe battery operation. Preferably, the thickness could be at most 60 µm or at most 40 µm or 30 µm. This thickness allows improved winding but still safe battery operation. Particularly preferably, the thickness could be at most 25 µm or at most 5 µm. Very compact batteries and capacitors can be constructed with layers of this thickness.

The structure according to the invention of the layer comprising a crosslinked binder allows the production of layers having high porosity which are still very stable. The layer could have a porosity of at least 25% or at least 30%. A layer having this porosity particularly effectively prevents the formation of short circuits owing to its density. The layer could preferably have a porosity of at least 15% or at least 40%. In a preferred embodiment, the porosity is greater than 55%. A battery having a high power density can be produced with a layer having this porosity. The layer described here still exhibits very small pores at high porosity, thus preventing the dendritic interpenetration from one side to another of the layer. Against this background it is conceivable that the second pores form a labyrinthine structure in which dendritic interpenetration from one side to another of the layer cannot take place.

The layer could have average pore sizes of at most 15 µm or at most 3 µm. Selection of this pore size has proven particularly advantageous for avoiding short circuits. More preferably, the average particle sizes could be at most 1 µm. A layer of this type avoids, in a particularly advantageous manner, short circuits due to metal dendrite growth, due to abrasion from electrode particles and due to direct contact of the electrodes when pressure is applied.

The layer could have a maximum tensile force in the longitudinal direction of at least 15 N/5 cm or at least 5 N/5 cm (as defined in EN 29 073-T3). A layer having this strength can be wound onto the electrodes of a battery without tearing.

The invention also relates to a method for producing a layer according to the invention, wherein
a) a solution or dispersion is prepared, containing the main body, which comprises the first pores, and crosslinkable polymers,
b) the polymers are crosslinked and
c) the coated main body is optionally dried and/or heated.

In this case, the polymers function as binders. In an embodiment of the invention, a solution or dispersion containing the crosslinkable polymers can initially be prepared. The polymers can be produced by polymerisation in the solution or dispersion or can be added to the solution or dispersion from the exterior. The main body is then impregnated with the solution or dispersion, followed by crosslinking.

In a further embodiment, the polymers are produced by polymerisation in the presence of the main body. The monomers are selected in such a way that a crosslinked or a crosslinkable polymer is obtained. With this embodiment, polymerisation and crosslinking preferably take place in a single batch. It is possible that the two reactions take place simultaneously or pass into one another. This can be achieved, for example, if bifunctional and polyfunctional monomers are contained in the batch. These monomers can participate twice or more in the reaction per molecule and thus link two or more polymer chains. It is advantageous if polymerisation and crosslinking take place substantially by the same mechanism in a single reaction.

It is also possible first to substantially terminate polymerisation and then purposefully to carry out crosslinking, for example by addition of catalysts, irradiation or heating. In this embodiment, the functional groups of bifunctional and/or polyfunctional monomers are preferably selected in such a way that some of the groups do not react during polymerisation.

The solution or dispersion in step a) can additionally contain the particles.

The invention also relates to a method for producing a layer according to the invention, wherein a) a solution or dispersion which contains polymerisable monomers is produced, at least some of the monomers being crosslinkable,
b) the main body comprising the first pores is impregnated with the solution or dispersion,
c) the monomers are polymerised,
d) the polymers obtained in step c) are crosslinked during or after polymerisation, and
e) the coated main body is optionally dried and/or heated.

The solution or dispersion in step a) can additionally contain the particles.

In a preferred embodiment of the invention, the monomers comprise a mixture of monofunctional and polyfunctional monomers.

The polymerisation in step c) is preferably carried out ionically or radically. Polymerisation is carried out in the presence of the main body and optionally the particles. The crosslinking in step d) is preferably carried out thermally or by radiation, in particular UV radiation.

In a preferred embodiment of the invention, the monomers are a mixture of monofunctional and bifunctional monomers. The proportion of bi- or polyfunctional monomers in the mixture is preferably 0.1 to 50% by weight, in particular 0.5 to 30% by weight.

The swelling behaviour of the layer may be optimised by combining various monomers and/or crosslinking agents. The swelling behaviour is dependent on the crosslinking density. This is significant, for example, when the layers are used as separators.

In a further embodiment of the invention, the solution or dispersion contains monomers for producing a crosslinkable binder and at least one further component selected from photoinitiators, radical initiators, ionic initiators, thermal initiators, chain transfer agents, chain regulators and protic as well as aprotic solvents.

In particular, monomers which can be radically or ionically polymerised are preferably used. These reactions are preferably assisted by photoinitiators. If the monomers are photochemically active, photoinitiators are not required as the monomers are then self-initiating and polymerisation starts automatically. Bifunctional or polyfunctional monomers are used if crosslinking takes place during polymerisation.

Thermal initiators can also be added in addition to the photoinitiators. A cooperative effect can be achieved in this way as the polymerisation and therefore also the crosslinking are accelerated. A combination of radiation treatments, for example using IR and UV radiation, is preferred. Overall production speed can thus be increased.

Particularly suitable monofunctional compounds for the radical polymerisation include compounds which contain at least two conjugate double bonds. Unsaturated polymers which can be crosslinked are obtained during polymerisation.

During radical polymerisation, it is preferable to use beta-unsaturated carboxylic acids, the salts thereof, the esters, amides or nitriles thereof as monofunctional monomers. A double bond or triple bond is present at the beta position. The esters and acids preferably have the general formula $R^1R^2C=C-COOR^3$. $R^1$, $R^2$ and $R^3$ are organic residues or H. The organic residues are, in particular, alkyl, aryl and alkaryl. The alkyl residues, in particular $R^3$, are, in particular, unbranched or branched C1 to C20 residues, preferably methyl, ethyl, propyl, isopropyl, ethyl-2-n-propyl, benzyl-2-n-propyl, butyl, isobutyl, pentyl, hexyl, octyl, ethylhexyl, decyl, isodecyl, stearyl, lauryl, cyclohexyl, isobornyl, 2-hydroxyethyl, ethoxy-ethoxy, furfuryl, tetrahydrofurfuryl, or aryl residues such as benzyl, phenyl and phenoxyethyl. The corresponding compounds which have an amide group in place of the ester group are also preferred.

In preferred embodiments of the invention, the monofunctional monomers are acrylates, methacrylates, acrylamides, methacrylamides or derivatives thereof. Suitable monomers include, for example, acrylic acid and methacrylic acid esters and the derivatives thereof, the ester component having up to 20 carbon atoms in the residue, for example methyl, ethyl, propyl, isopropyl, ethyl 2-n-propyl, benzyl 2-n-propyl, butyl, isobutyl, pentyl, hexyl, octyl, ethylhexyl, decyl, isodecyl, stearyl, lauryl, cyclohexyl, isobornyl, phenyl, benzyl, phenoxyethyl, 2-hydroxyethyl, ethoxy-ethoxy, furfuryl, tetrahydrofurfuryl.

Particularly preferred are fluorinated or perfluorinated acrylates and methacrylates, ethyleneglycol-methylether-acrylate, ethyleneglycoldicyclopentenylether-acrylate, poly(ethyleneglycol)-methylether-acrylates having a molecular weight of about 200 to 500, poly(propyleneglycol)-acrylates having a molecular weight of about 200 to 500, di(ethyleneglycol) 2-ethylhexyl-ether-acrylate, 2-(2-oxo-1-imidazolidinyl)-ethyl-methacrylate, 2-(diethylamino)ethyl-acrylate, 2-(diethylamino)-ethyl-methacrylate, 4-acryloylmorpholine. Also suitable are monofunctional urethane acrylates and methacrylates, styrene, α-alkylstyrene, vinyltoluene, vinylstearate. Also suitable are acrylamides, methacrylamides, N-methylolacrylamide, N-methylolmethacrylamide, unsaturated nitriles, such as acrylonitrile, methacrylonitrile. Further suitable monofunctional monomers include vinyl ether, vinyl acetate, vinyl propionate, vinyl butyrate, 1-vinyl-2-pyrrolidone, 2-vinyl pyridine, N-vinyl caprolactam, N-vinyl formamide, N-vinyl phthalimide, 3-vinyl anisole, 2-vinyl anisole, crotonic acid and crotonic acid esters, acrylamidomethylpropane sulfonic acid, maleic acid and maleic acid esters, fumaric acid and fumaric acid esters as well as itaconic acid and itaconic acid esters. Mixtures of the aforementioned monofunctional monomers can also be used.

Compounds which can be polymerised and/or crosslinked at two or more positions in the molecule are particularly suitable as bifunctional or polyfunctional monomers for radical polymerisation. A network can thus be formed during polymerisation. Compounds of this type preferably have two identical or similar reactive functionalities. Alternatively, compounds having at least two differently reacting functionalities can be used. For example, one reactive group can polymerise and the other reactive group which is not participating in polymerisation can be purposefully crosslinked.

Suitable bifunctional and polyfunctional monomers for radical polymerisation include, for example, diacrylates, dimethycrylates, triacrylates, trimethacrylates, tetraacrylates, tetramethacrylates, pentaacrylates, pentamethacrylates, hexaacrylates and hexamethacrylates. Particularly suitable are 1,3-butanedioldiacrylate, 1,6-hexanedioldiacrylate, 1,9-nonanedioldiacylate, neopentylglycoldiacrylate, 1,6-hexanediol-ethoxylatediacrylate, 1,6-hexanediol-propoxylatediacrylate, 3-(acryloyloxy)-2-hydroxypropylmethacrylate, 3-hydroxy-2,2-dimethylpropyl 3-hydroxy-2,2-dimethylpropionatediacrylates, 5-ethyl-5-(hydroxymethyl)-β,β-dimethyl-1,3-dioxan-2-ethanoldiacrylate, bisphenol-A-ethoxylatediacrylate having a molecular weight of about 450 to 700, bisphenol-A-propoxylatediacrylate, di(ethylenegylcol)-diacrylate, pentaerythritol diacrylate monostearate, poly(ethyleneglycol)-diacrylate having a molecular weight of about 250 to 1000, tetra(ethyleneglycol)-diacrylate, tri(propylene glycol)diacrylate, tri(propyleneglycol)-glycerolatediacrylate, trimethylolpropane-benzoatediacrylate, vinylcrotonate, divinylbenzene, 1,6-bis(3,4-epoxy-4-methylcyclohexane carboxylic acid)hexyldiester, vinylacrylate, vinylmethacrylate, di(trimethylolpropane)-tetraacrylate, dipentaerythritol penta-/hexa-acrylate, pentaerythritol propoxylate-triacrylates, pentaerythritol tetraacrylate, trimethylolpropane-ethoxylate-triacrylates having a molecular weight of 400 to 1000, and tris[2-(acryloyloxy)ethyl]-isocyanurate.

According to the invention, ionic polymerisation can also be carried out. This can be anionic or cationic polymerisation. Unsaturated compounds, in particular those with a carbon-carbon double bond, are suitable as monomers.

Suitable monofunctional monomers for ionic polymerisation include, for example, glycidyl-phenylether, limonenoxide, cyclohexeneoxide, cyclooctenoxide, butyl-glycidylether, glycidyl-isobutylether, glycidylisopropylether, 2-ethylhexyl-glycidylether, 2-methyl-2-vinyloxirane, 1,2-epoxybutane, 1,2-epoxy-5-hexene, 1,2-epoxydecane, 1,2-epoxydodecane, fluorinated and perfluorinated oxiranes having up to 20 carbon atoms.

In particular the following bifunctional and polyfunctional monomers and crosslinking agents are used during ionic polymerisation: bisphenol-A-diglycidylether, 1,2,5,6-diepoxycyclooctane, 1,2,7,8-diepoxyoctane, 1,3-butadienediepoxide, 4-butanedioldiglycidylether, 1,4-cyclohexanedimethanol-diglycidylether, 3,4-epoxycyclohexylmethyl 3,4-epoxycyclohexancarboxylate, 4,4'-methylenebis(N,N-diglycidylaniline), bis(3,4-epoxycyclohexylmethyl)adipate, ethyleneglycol-diglycidylether, neopentylglycol-diglycidylether, poly[(o-cresylglycidylether)-coformaldehyde] having an Mn of about 350 to 1100 g/mol, polyethyleneglycoldiglycidylether having a $M_w$ of about 330 to 600 g/mol, poly(propyleneglycol)-diglycidylether having a $M_w$ of about 350 to 700 g/mol, 5-amino-1,3,3-trimethylcyclohexanmethylamine, poly(propyleneglycol)bis(2-aminopropylether), triethylenetetramine, 4,4'-methylenedianiline, 1,2-cyclohexane dicarboxylic anhydride.

Polymerisation initiators may be added to the solution or dispersion. Photoinitiators are preferably used during ionic polymerisation and during radical polymerisation. In a further embodiment, no photoinitiators are present. Some known monomers initiate polymerisation without photoinitiators merely by the absorption of radiation. If this is not the case, photoinitiators are added. These initiators can initiate radical and/or ionic polymerisation. Initiation is carried out by radiation in this case. The proportion of polymerisation initiators in the solution or dispersion can be between 0.05 to 10% by weight or 0.05 and 5% by weight, in particular 0.1 to 3% by weight. Polymerisation can be influenced by the amount of initiator. In general, the use of more initiator leads to shorter polymer chains. The swelling characteristics and thermal characteristics of the layer obtained are influenced in this way.

Reaction initiators can be used during radical polymerisation. These are usually compounds which liberate residues under specific conditions such as irradiation or elevated temperature. Suitable initiators for radical polymerisation include, for example, 1-hydroxycyclohexyl phenylketone, 2,2-diethoxyacetophenone, 2-benzyl-2-(dimethylamino)-4'-morpholinobutyrophenone, hydroxy-2-methylpropiophenone, 2-hydroxy-4'-(2-hydroxyethoxy)-2-methylpropiophenone, 2-methyl-4'-(methylthio)-2-morpholinopropiophenone, 3,6-bis(2-methyl-2-morpholinopropionyl)-9-octylcarbazol, 3'-hydroxyacetophenone, 4'-ethoxyacetophenone, 4'-hydroxyacetophenone, 4'-phenoxyacetophenone, 4'-tert-butyl-2',6'-dimethylacetophenone, 2,2-dimethoxy-2-phenylacetophenone, 4-(dimethylamino)benzoin, 4'-dimethylbenzil, benzoin ethyl ether, benzoin methyl ether, (4-benzoylbenzyl)trimethylammonium chloride, [2-(acryloyloxy)ethyl](4-benzoylbenzyl)dimethylammonium bromide, 5-dimethylbenzophenone, 2-methylbenzophenone, benzophenone-3,3',4,4'-tetracarboxylic dianhydride, 3,4-dimethylbenzophenone, 3-hydroxybenzophenone, 3-methylbenzophenone, 4-(diethylamino)benzophenone, 4-(dimethylamino)benzophenone, 4-(ptolylthio)benzophenone, 4,4'-bis[2-(1-propenyl)phenoxy]benzophenone, 4,4'-bis(diethylamino)benzophenone, Michler's ketone, 4,4'-dihydroxybenzophenone, 5,5'-methylenebis(2-hydroxy-4-methoxybenzophenone and benzophenone.

Thermal radical initiators can also be used. At elevated temperature, they break down into residues which initiate polymerisation. Suitable thermal radical initiators include, for example, 4,4'-azobis(4-cyanovaleric acid), 1,1'-azobis(cyclohexanecarbonitrile), 2'-azobis(2-methylpropionitrile), benzoylperoxide, 2,5-bis(tert-butylperoxy)-2,5-dimethylhexane, bis[1-(tert-butylperoxy)-1-methylethyl]benzene, tert-butylperoxide, tert-butylperoxybenzoate, cumenehydroperoxide, dicumylperoxide and lauroylperoxide.

Initiators can be used during ionic polymerisation. They are usually compounds such as Lewis bases or Bronsted acids which produce ions in a first reaction. Suitable initiators for the ionic initiators include, for example, (4-bromophenyl)diphenylsulfoniumtriflate, (4-chlorophenyl)diphenylsulfonium triflate, (4-fluorophenyl)diphenylsulfonium triflate, (4-iodophenyl)diphenylsulfonium triflate, (4-methoxyphenyl)diphenylsulfonium triflate, (4-methylphenyl)diphenylsulfonium triflate, (4-methylthiophenyl)methyl phenyl sulfonium triflate, (4-phenoxyphenyl)diphenylsulfonium triflate, (4-phenylthiophenyl)diphenylsulfonium triflate, (4-tert-butylphenyl)diphenylsulfonium triflate, (tert-butoxycarbonylmethoxynaphthyl)-diphenylsulfonium triflate, bocmethoxyphenyldiphenylsulfonium triflate, 2-(4-methoxystyryl)-4,6-bis(trichloromethyl)-1,3,5-triazine, 2-naphthyl diphenylsulfonium triflate, [4-[(2-hydroxytetradecyl)oxy]phenyl]phenyliodonium hexafluoroantimonate, bis(4-tert-butylphenyl)iodonium perfluoro-1-butanesulfonate, bis(4-tert-butylphenyl)iodonium p-toluenesulfonate, bis(4-tert-butylphenyl)iodonium triflate, bis(4-tert-butylphenyl) iodonium triflate, diphenyliodonium p-toluenesulfonate, diphenyliodonium triflate, diphenyliodonium-9,10-dimethoxyanthracene-2-sulfonate, N-hydroxy-5-norbornen-2,3-dicarboximide perfluoro-1-butanesulfonate, N-hydroxynaphthalimide triflate, N-hydroxyphthalimide triflate, thiobis(triphenyl sulfonium hexafluorophosphate), triarylsulfonium hexafluoroantimonate salts, triarylsulfonium hexafluorophosphate salts, triphenylsulfonium perfluoro-1-butanesufonate, triphenylsulfonium triflate, tris(4-terf-butylphenyl)sulfonium perfluoro-1-butanesulfonate, tris(4-tert-butylphenyl)sulfonium triflate, 2-tert-butylanthraquinone and 2-tert-butylanthraquinone.

Further known additives can be used to assist the polymerisation reactions. Chain transfer agents and regulators, for example, are suitable. Suitable chain transfer agents and regulators include, for example, carbon tetrachloride, chloroform, 1-butanethiol, 2,2'-(ethylenedioxy)diethanethiol, 4,4'-thiobisbenzenethiol, butyl 3-mercaptopropionate, ethyl 3-mercaptopropionate, methyl 3-mercaptopropionate, pentaerythritol tetrakis(2-mercaptoacetate)pentaerythritol tetrakis(3-mercaptopropionate), tert-nonyl mercaptan and raft reagents.

In a preferred embodiment of the invention, the main body is impregnated with the following solution or dispersion:
a) 1 to 100% by weight, in particular 2 to 80% by weight of polymerisable monomers,
b) 0 to 80% by weight, in particular 2 to 70% by weight of particles,
c) 0 to 10% by weight, in particular 0.05 to 5% by weight of polymerisation initiators,
d) 0 to 5% by weight, in particular 0.05 to 3% by weight of chain transfer agents,
e) 0 to 95% by weight, in particular 0 to 90% by weight or 0 to 75% by weight of solvents.

Solutions or dispersions which are suitable for polymerisation contain, for example, methacrylate, dimethacrylate and PVP; or vinylpyrrolidone, PVP and PVP particles; or PVDF particles, PVP, monomethacrylate and dimethacrylate; or acrylic acid and surfactant, optionally in combination with aluminium oxide or PTFE particles.

The polymerisable monomers, preferably contain up to 50, in particular 0.1 to 30 or 0.2 to 20% by weight of bifunctional or polyfunctional monomers. The other monomers are monofunctional monomers. The addition of a solvent is optional. If the monomers are liquid, the particles can also be dissolved in the monomer.

In a preferred embodiment, polymerisation and crosslinking of the impregnated main body are carried photochemically with subsequent drying of the layer.

According to the invention, a heat-resistant microporous single-ply layer can be obtained. The layer according to the invention can be combined with other components to form multi-ply systems. According to the invention, a plurality of layers according to the invention can be combined.

In a particular embodiment of the invention, the layer is aftertreated in order to achieve at least partial separation of the polymeric binder and the particles. A microporous structure can be obtained in this way. This separation is achieved if various polymers which have only limited compatibility are used as binder and as particles.

In a preferred embodiment of the invention, a solution or dispersion is initially produced. It contains the monomers and optionally the particles and further additives.

The additives may be selected in such a way that they influence the rheology and therefore the processing and/or the stability of the dispersion and do not impair polymerisation and battery properties. Conventional dispersion additives such as acids, bases, surfactants, for example ionic or non-ionic surfactants, thickeners such as alginic acid, agar, carrageen, carob powder, guar powder, tragacanth gum, gum arabic, xanthan gum, karaya gum, tara powder, gellan, pectin, cellulose, cellulose ether, carboxymethyl cellulose, hydroxypropyl cellulose, hydroxypropylmethyl cellulose, methylcellulose, methylethyl cellulose, modified starch, polyethyleneglycol and carbopol, polymers such as polyacrylates, oligoethers, polyethers and polyelectrolytes can be used. Silicates, in particular bentonites, hectorites, montmorillonites, wollastonites and hydrated oxide particles such as $SiO_2$ particles, $Al_2O_3$ particles or $TiO_2$ particles may also be used as thickeners. The particles used may be in the form of a dispersion immediately after production or may be made available in the form of a dispersion by the manufacturer. They may possibly have to be dispersed in the first instance. Conventional dispersion aids such as surfactants and emulsifiers may be used.

To produce the dispersion, the components are assembled and homogenised while stirring and optionally while heating. The dispersion may be an aqueous dispersion. However, a dispersion in a solvent or in a water/solvent mixture may also be used. The solids content of the dispersion is preferably between 5 to 70, preferably 20 to 65, and more preferably 25 and 45% by weight.

The dispersion can be applied to the main body, in particular the non-woven fabric, by known methods of coating. In particular embodiments, a main body is preferably coated continuously or else semi-continuously by conventional coating methods. Suitable methods include, for example, doctoring, spraying, curtain coating, roller systems such as 2, 3 and 5 roller systems, 3 roller combi systems, micro roller systems, reverse roll systems, engraved roller systems, dipping systems, slot die systems, knife systems, double side systems, commabar systems, foam application or preferably impregnation. The coating speed may be 0.5 to 1000 or 0.5 to 200 m/min, preferably 20 to 200 or 20 to 1000 m/min and more preferably between 50 and 200 or 50 to 100 m/min. The coated main body is then preferably dried and optionally compacted. The coating can be dried at 50 to 500° C. or 50 to 200° C., preferably 100 to 200° C. and more preferably between 120 and 200° C. The heating and/or drying can be carried out by contact (calendering, drum dryer, belt dryer) and also without contact (warm air, hot air, IR radiation, microwaves) or by other heating methods known from the art.

The layer could be mechanically compacted by calendering. Calendering also reduces the surface roughness. The particles which are optionally used on the surface of the main body have flattened regions after calendering.

The method according to the invention using monomers which are polymerised in the presence of the layer has various advantages. One advantage is that the method can be carried out very quickly. The main body can be coated and photochemically crosslinked in one production step. The great advantage of photochemical crosslinking resides in its speed and uniformity. The method is therefore much faster than known methods in which non-woven fabrics are coated and then heat-treated, calendered or further processed by similar methods.

In addition, the method is very versatile and can therefore be readily adapted to specific requirements, for example the specific requirements in a battery with respect to electrodes, electrolytes and battery design. The wetting behaviour, for example of a separator, by the respective electrolytes, can be optimised by the selection of the monomers and optionally the particles. The swelling behaviour of a separator in the presence of electrolytes can be optimised by the choice of the monomers, the crosslinked density and the particles.

The adhesion of the layer, for example as a separator to the electrodes can also be improved by the selection of the materials. This is important for the lamination of separators and electrodes which is an important step in the production of Li-polymer batteries.

The layer described here can be used as a separator, in particular in batteries and capacitors, because it prevents short circuits in a particularly effective manner.

It can also be used as a gas diffusion layer or membrane in fuel cells, as it exhibits good wetting properties and can transport liquids. The invention therefore also relates to a fuel cell, a battery, a battery electrolyte system or a capacitor containing at least one layer according to the invention.

The layer according to the invention is particularly suitable for combination with typical battery electrolyte systems composed of one or more liquids and one or more base electrolytes. Suitable solvents for electrolyte systems include, for example, those based on carbonates such as ethylene carbonate, diethyl carbonate, dimethyl carbonate and propylene carbonate, or lactones such as butyrolactone. Mixtures of these solvents are often used.

The conventional solvents such as the above-mentioned carbonates have the drawback of being highly flammable. Other electrolyte systems based on ionic liquids have therefore been developed. Ionic liquids have the advantage that they are much less flammable than carbonates. Mixtures of ionic liquids, and also mixtures of ionic liquids (IL) with the above-mentioned conventional solvents are used. Ionic liquids consist, for example, of liquid salts containing a cation based on ammonium, pyridinium, pyrrolium, oxazolium, oxazolinium, imidazolium or phosphonium ions.

Frequently used conducting salts include, in particular, lithium salts such as $LiPF_6$, $LiClO_4$, $LiAsF_6$, $LiBF_4$, $LiCF_3SO_3$, $LiN(CF_3SO_2)_2$, $LiN(CF_2CF_3SO_2)_2$, $LiSbF_6$, $LiAlCl_4$, $LiGaCl_4$, $LiCl$, $LiNO_3$, $LiSCN$, $LiO_3SCF_2CF_3$, $LiC_6F_5SO_3$, $LiO_2CCF_3$, $LiFSO_3$, $LiB(C_6H_5)_4$, $LiB(C_2O_4)_2$, $Li(NTF_2)$. The concentration of conducting salt is 0.2 mol/kg (based on electrolyte solvent) up to the limit of solubility, preferably 0.2 to 0.8 mol/kg and more preferably 0.4 to 0.6 mol/kg.

Finally, it should be particularly emphasised that the specific embodiments contained in the application merely have the function of illustrating the teaching according to the invention but do not limit it.

PRACTICAL EXAMPLES

Methods of Measurement

To determine the weight per unit area, three respective 100×100 mm samples were punched out, the samples were weighed and the measured value multiplied by 100.

The thicknesses were measured using a precision thickness measuring device model 2000 U/Electrik. The measured area was 2 cm$^2$ and the measured pressure was 100 cN/cm$^2$.

Example 1

130 parts of a polyvinylpyrrolidone (PVP; Luvitec K90, BASF) solution were added to 320 parts of a 50% methoxy-polyethylene glycol 750-methacrylate solution (PLEX®06850-O, Evonik) with constant stirring. 4 parts of polyethylene glycol 200-dimethacrylate, 2.7 parts of Irgacure 754 (Ciba) and 1.3 parts Irgacure 819 DW (Ciba) were then added, also with stirring and in the absence of light.

Coating

A 30×49, 5 cm large PET non-woven fabric (Freudenberg, thickness: 20 μm, weight per unit area: 11.6 g/m$^2$) was coated by a roller coating method, passed through a UV table dryer (Technigraf, Aktiprint T model) and dried at 120° C.

A coated non-woven fabric having a weight per unit area of 15 g/m$^2$ and a thickness of 23 μm was obtained.

Example 2

100 parts of a 25% PVP-particle dispersion (Luvicross, BASF), 75 parts vinylpyrrolidone and 140 parts deionised water were added to 65 parts of a 5% PVP (polyvinylpyrrolidone) solution (Luvitec K90, BASF) with constant stirring. 2.7 parts Irgacure 754 (Ciba) and 1.3 parts Irgacure 819 DW (Ciba) were then added, also with stirring and in the absence of light.

Coating

A 30×49, 5 cm large PET non-woven fabric (Freudenberg, thickness: 20 μm, weight per unit area: 11.6 g/m$^2$) was coated by a roller coating method, passed repeatedly through a UV table dryer (Technigraf, Aktiprint T model) and dried at 120° C.

A coated non-woven fabric having a weight per unit area of 16 g/m$^2$ and a thickness of 23 μm was obtained.

Example 3

200 parts of a 2% PVP (polyvinylpyrrolidone) solution (Luvitec K90, BASF), 15 parts of polyethylene glycol 200-dimethacrylate (Evonik) and 60 parts of a 50% methoxypolyethylene glycol 750-methacrylate (Evonik) solution were added to 200 parts of a 57% PVDF dispersion (KYNAR 301F, Arkema, average particle size 0.25 μm) with constant stirring using a blade mixer. 2.7 parts Irgacure 754 (Ciba) and 1.3 parts Irgacure 819 DW (Ciba) were then added, also with stirring and in the absence of light.

Coating

A 15 cm wide PET non-woven fabric (Freudenberg, thickness: 20 μm, weight per unit area: 11.3 g/m$^2$) was continuously coated by a roller coating method, passed repeatedly through a UV table dryer (Technigraf, Aktiprint T model) and dried at 120° C.

A coated non-woven fabric having a weight per unit area of 22 g/m$^2$ and a thickness of 30 μm was obtained.

Example 4

12.50 parts surfactant (alkylpolyethyleneglycoletherethoxylate; Lutensol ON 118; BTC), 1.75 parts 2,2-dimethoxy-2-phenylacetophenone (Aldrich), 6.52 parts triallyl-1,3,5-triazine-2,4,6 (1H,3H,5H)-trione (Aldrich) and 28.34 parts deionised water were added to 50.89 parts of an 80% acrylic acid solution (Ceda Chemicals) with constant stirring using a blade mixer and in the absence of light.

Coating

A 15 cm wide PET non-woven fabric (Freudenberg, thickness: 20 μm, weight per unit area: 11.3 g/m$^2$) was continuously coated by a roller coating method, passed through a UV table dryer (Technigraf, Aktiprint T model) and dried at 60° C.

A coated non-woven fabric having a weight per unit area of 17 g/m$^2$ and a thickness of 25 μm was obtained.

Example 5

12.50 parts Lutensol ON 188 (BTC), 14 parts of a 60% aluminium oxide dispersion ($Al_2O_3$) (average particle size 0.7 μm), 1.75 parts 2,2-dimethoxy-2-phenylacetophenone (Aldrich), 6.52 parts triallyl-1,3,5-triazine-2,4,6 (1H,3H,5H)-trione (Aldrich) and 28.34 parts deionised water were added to 50.89 parts of an 80% acrylic acid solution (Ceda Chemicals) with constant stirring using a blade mixer and in the absence of light.

Coating

A 15 cm wide PET non-woven fabric (Freudenberg, thickness: 20 μm, weight per unit area: 11.3 g/m$^2$) was continuously coated by a roller coating method, passed through a UV table dryer (Technigraf, Aktiprint T model) and dried at 120° C.

A coated non-woven fabric having a weight per unit area of 22 g/m$^2$ and a thickness of 29 μm was obtained.

Example 6

12.50 parts Lutensol ON 188 (BTC), 10 parts of a 60% PTFE dispersion (Dyneon TF 5032R, 3M, average particle size 160 nm), 1.75 parts 2,2-dimethoxy-2-phenylacetophenone (Aldrich), 6.52 parts triallyl-1,3,5-triazine-2,4,6 (1H,3H,5H)-trione (Aldrich) and 28.34 parts deionised water were added to 50.89 parts of an 80% acrylic acid solution (Ceda Chemicals) with constant stirring using a blade mixer and in the absence of light.

Coating

A 15 cm wide PET non-woven fabric (Freudenberg, thickness: 20 μm, weight per unit area: 11.3 g/m$^2$) was continuously coated by a roller coating method, passed through a UV table dryer (Technigraf, Aktiprint T model) and dried at 120° C.

A coated non-woven fabric having a weight per unit area of 23 g/m$^2$ and a thickness of 28 μm was obtained.

Table 1 shows the values obtained for the thickness and the weight of the samples obtained from examples 1 to 6.

TABLE 1

| Sample | Method | Thickness [μm] | Weight [g/m$^2$] |
|---|---|---|---|
| Example 1 | roller coating and UV crosslinking | 23 | 15 |
| Example 2 | roller coating and UV crosslinking | 23 | 16 |
| Example 3 | roller coating and UV crosslinking | 30 | 22 |
| Example 4 | roller coating and UV crosslinking | 25 | 17 |
| Example 5 | roller coating and UV crosslinking | 29 | 22 |
| Example 6 | roller coating and UV crosslinking | 28 | 23 |

The invention claimed is:

1. A single-ply layer comprising:
   a non-woven fabric as a main body having a plurality of first pores, the main body being at least partly filled with inorganic particles, the inorganic particles filling at least some of the plurality of first pores and forming particle-filled regions, wherein the inorganic particles in the particle-filled regions form a plurality of second pores in a labyrinthine structure in which dendritic interpenetration from one side to another of the single-ply layer cannot take place, an average diameter of the inorganic particles being greater than an average pore size of the plurality of second pores; and
   a crosslinked binder comprising an organic polymer, forming a network in the first pores and the second pores, wherein a thickness of the single-ply layer is less than 100 μm, and
   wherein the crosslinked binder is applied as an aqueous dispersion.

2. The single-ply layer as recited in claim 1, wherein each of the inorganic particles have a spherical configuration.

3. The single-ply layer as recited in claim 1, wherein the inorganic particles are distributed homogeneously in a planar manner in the main body.

4. The single-ply layer as recited in claim 1, wherein at least a portion of the particle-filled regions is in the form of a coating of the main body.

5. The single-ply layer as recited in claim 1, wherein the binder comprises an organic polymer comprising a beta-unsaturated carboxylic acid, beta-unsaturated carboxylic acid salt, beta-unsaturated carboxylic acid ester, beta-unsaturated carboxylic acid amide, beta-unsaturated nitrile, acrylate, derivative of an acrylate, methacrylate, derivative of a methacrylate, a copolymers of any of these, or a mixture of two or more of any of these.

6. The single-ply layer as recited in claim 1, wherein the binder has a melting point less than a melting point of the inorganic particles, the main body, or both.

7. The single-ply layer as recited in claim 1, wherein the inorganic particles include an average diameter in a range of 0.01 and 10 μm.

8. The single-ply layer as recited in claim 1, further comprising:
   an organic particle comprising a polyacetal, polycycloolefin copolymer, polyester, polyimide, polyether ketone, polycarboxylic acid, polycarboxylate, rubber, polyvinyl compound, polyether, polynitrile, polysulfone, halogenated polymer, unsaturated polymer, copolymer of any of these, or a mixture of two or more of any of these.

9. The single-ply layer as recited in claim 1, further comprising:
   organic particles comprising a polypropylene, polyvinylpyrrolidone, polyester, fluorinated polymer, chlorinated polymer, polystyrene, styrene butadiene copolymers, polyacrylate, nitrile butadiene polymer, polymethacrylate, polyether amide, polyether imide, polyether ketone, EPDM-rubber, polyvinylpyridine, polyetherketone, polyacrylonitrile, polysulfone, polyethylene, polyoxymethylene, polybenzimidazole, copolymer of any of these, or a mixture of two or more of any of these.

10. The single-ply layer as recited in claim 1, further comprising:
    further inorganic particles.

11. The single-ply layer as recited in claim 10, wherein the further inorganic particles comprises a metal oxide, metal hydroxide, nitride, carbonitride, carbooxonitride, borate, sulfate, carbonate, glass, silicate, or a mixture of two or more of these.

12. The single-ply layer as recited in claim 1, wherein the non-woven fabric includes a fiber,
    wherein an average length of the fiber is at least twice an average diameter of the fiber.

13. The single-ply layer as recited in claim 1, wherein the non-woven fabric includes a fiber,
    wherein at least 90% of the fiber has an average diameter of at most 12 μm.

14. The single-ply layer as recited in claim 1, wherein the non-woven fabric includes a fiber,
    wherein at least 40% of the fiber has an average diameter of at most 8 μm.

15. The single-ply layer as recited in claim 1, wherein the layer has a porosity of at least 15%.

16. The single-ply layer as recited in claim 1, wherein the plurality of second pores each have a pore size of at most 3 μm.

17. The single-ply layer as recited in claim 1, wherein the layer has a maximum tensile force of at least 15 N/5 cm in a longitudinal direction.

18. The single-ply layer as recited in claim 1, wherein the main body is calendered.

19. A method for producing the single-ply layer according to claim 1, comprising:
   preparing a solution or dispersion including crosslinkable polymers and a main body having a plurality of first pores;
   crosslinking the polymers so as to coat the main body; and
   drying the coated main body.

20. A method for producing the monolayer single-ply layer according to claim 1, comprising:
   producing a solution or dispersion including polymerizable monomers, at least some of the monomers being crosslinkable;
   impregnating a main body having a plurality of first pores with the solution or dispersion;
   polymerizing the monomers;
   crosslinking the polymerized monomers; and
   drying the impregnated main body.

21. The method as recited in claim 20, wherein the monomers include a mixture of monofunctional and bifunctional and/or polyfunctional monomers.

22. The method as recited in claim 20, wherein the polymerizing is performed ionically or radically.

23. The method as recited in claim 20, wherein the crosslinking is performed thermally or by radiation.

24. The method as recited in claim 20, wherein the solution or dispersion contains at least one further component selected from the group consisting of photoinitiators, radical initiators, ionic initiators, thermal initiators, chain transfer agents, chain regulators and protic and aprotic solvents.

25. The method as recited in claim 20, wherein the solution or dispersion contains particles.

26. A fuel cell, a battery separator, a capacitor separator, a gas-diffusing layer, or a membrane, comprising the single-ply layer as recited in claim 1.

* * * * *